United States Patent [19]
Makinen et al.

[11] Patent Number: 5,794,772
[45] Date of Patent: Aug. 18, 1998

[54] CONTAINER FOR RECORDABLE DIGITAL OPTICAL DISCS WITH WINDOW AND SCALE FOR DETERMINING AVAILABLE SPACE

[75] Inventors: Bruce A. Makinen, Fort Collins; Luke Waaler, Loveland, both of Colo.

[73] Assignee: Hewlett-Packard Company, Palo Alto, Calif.

[21] Appl. No.: 791,234

[22] Filed: Jan. 30, 1997

[51] Int. Cl.$^6$ ............................................. B65D 85/57
[52] U.S. Cl. ..................... 206/308.1; 116/334; 206/459.1
[58] Field of Search .............................. 116/240, 334, 116/335; 206/308.1, 387.1, 459.1; 369/291; 40/340

[56] References Cited

U.S. PATENT DOCUMENTS

| | | | |
|---|---|---|---|
| 2,511,708 | 6/1950 | Hammond, Jr. | 116/335 |
| 2,802,290 | 8/1957 | Carey | 116/334 |
| 3,272,325 | 9/1966 | Schoenmakers | 206/387.1 |
| 4,613,044 | 9/1986 | Saito et al. | 206/308.1 |
| 4,651,876 | 3/1987 | Tanuma et al. | 206/459.1 |
| 5,081,446 | 1/1992 | Gill et al. | 206/308.1 |
| 5,284,243 | 2/1994 | Gelardi et al. | 206/308.1 |
| 5,595,798 | 1/1997 | Miller | 206/312 |

*Primary Examiner*—Jimmy G. Foster
*Attorney, Agent, or Firm*—Augustus W. Winfield

[57] ABSTRACT

A container for a recordable compact disc. The container includes a window area with adjacent scales. A boundary between a recorded area and an unrecorded area on the compact disc is visible through the window area. The adjacent scales indicate recorded time, remaining time, recorded data in megabytes or remaining capacity in megabytes.

3 Claims, 3 Drawing Sheets

CONTAINER FOR RECORDABLE DIGITAL OPTICAL DISCS WITH WINDOW AND SCALE FOR DETERMINING AVAILABLE SPACE

FIELD OF INVENTION

This invention relates generally to containers for digital mass memory media and more specifically to a package for recordable compact discs.

BACKGROUND OF THE INVENTION

In general, there are three types of digital optical discs: read-only, recordable (also called Write-Once or Write-Once-Read-Many (WORM)) and erasable (also called rewritable). Examples of commercially available read-only optical disc technologies are the Compact Disc (CD) for digital audio and the Compact Disc-Read Only Memory (CD-ROM) for computer data. Compact Disc-Recordable (CD-R) drives and media are also commercially available. An example of an erasable (rewritable) optical disc technology is the Magneto-Optic (MO) disc, widely used for computer data storage.

For some recordable (write-once) discs, the entire medium must be written at one time. A new generation of CD-R drives enables part of a disc to be written and then enables additional data to be appended at a later time. There is a need for visual determination of storage availability on CD-R discs.

SUMMARY OF THE INVENTION

A container for a compact disc includes a window and a scale adjacent to the window. Recordable (write-once) compact discs of interest are recorded on a spiral track, starting at the center of the disc and progressing toward the outside edge. For recordable compact disc media using dye color-change technology, the area of the disc that has been written is a visibly different color than the unwritten area. The color-change boundary is visible through the window in the container, with the scale indicting used or available time and memory.

BRIEF DESCRIPTION THE DRAWINGS

DETAILED DESCRIPTION OF THE PREFERRED EMBODIMENT OF THE INVENTION

There are many alternative technologies for storing information optically. Recordable (write once) media commonly contain a layer with a dye material that changes color when exposed to a laser. Recordable compact discs typically record on a spiral track, starting from a position closest to the center of the disc and progressing toward the outer edge of the disc. For dye color-change materials, the written area of the spiral track is a visibly different color than the unwritten area of the spiral track. In general, there is a distinct visible boundary.

Compact discs are commonly stored in clear plastic containers commonly called "jewel" boxes. Typically a compact disc has a label or various printed material on one side, and the digital information layer is on the opposite side from the label. Typically, the compact disc is placed into the jewel box with the label facing outside and the information layer facing the bottom of the box.

Figure 1:
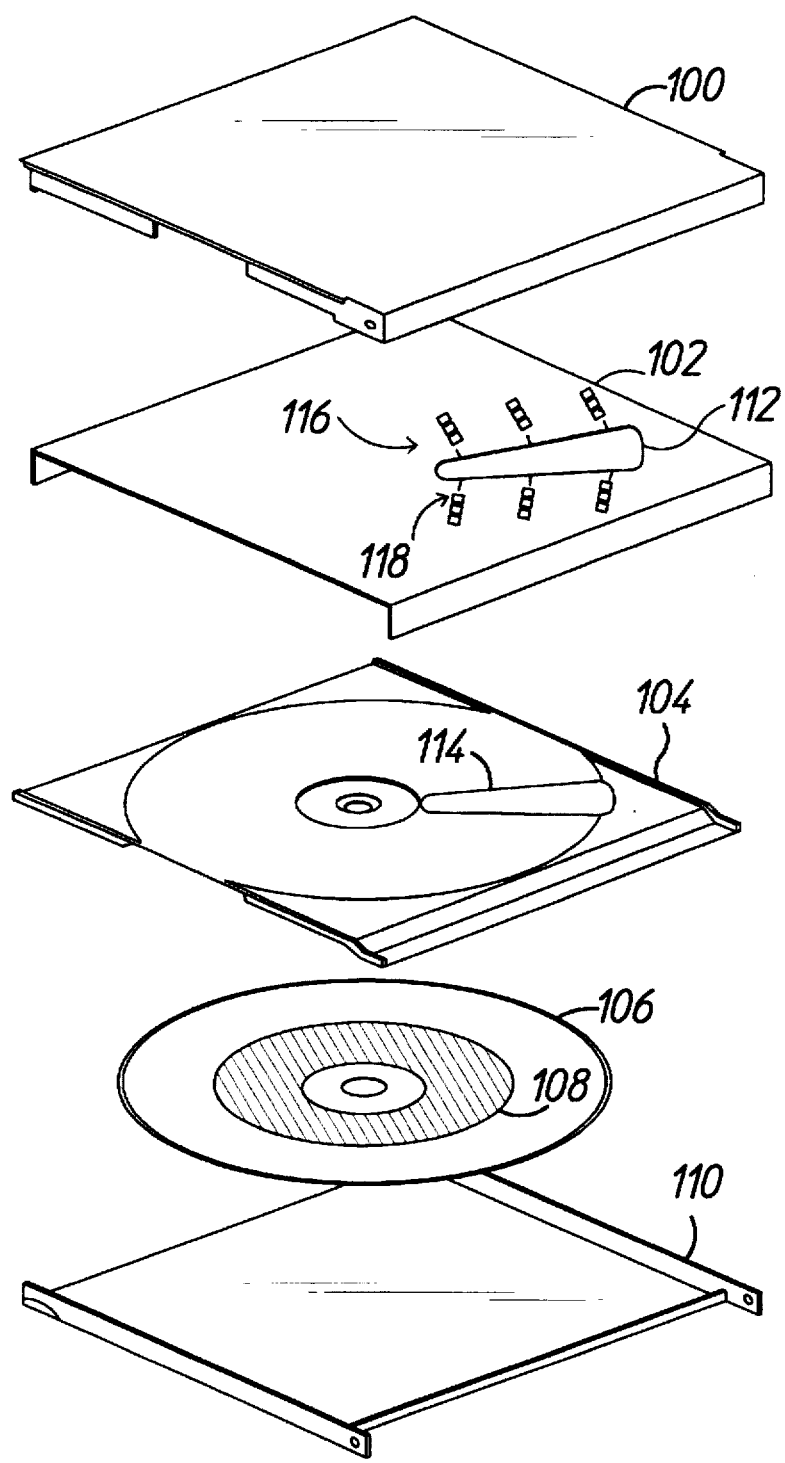
FIG. 1 is a perspective exploded bottom view of a compact disc container in accordance with the invention.

FIG. 1 illustrates one example embodiment of a jewel box with an outer box bottom part 100 and an outer box top part 110. In the embodiment of FIG. 1, the bottom part 100 is transparent. The jewel box may also include printed material 102. The jewel box may also contain a separate insert 104 that has a central portion adapted for clamping a hole in the center of a compact disc. As illustrated in FIG. 1, a recordable compact disc 106 is placed between the insert 104 and the top 110. The recordable compact disc 106 is oriented so that the digital information layer faces the bottom part 100 of the jewel box. The digital information layer may contain digitized audio, or computer data, or both. A boundary 108 is visible on the disc 106 where recorded data ends and an unrecorded area begins. A window 112 is formed as an opening in the printed material 102. A window 114 is formed as an opening in the insert 104. When assembled, window 112 in the printed material 102 and window 114 in the insert 104 are aligned. Scales 116 and 118 are printed on the printed material 102, adjacent to window 112.

Figure 2A:
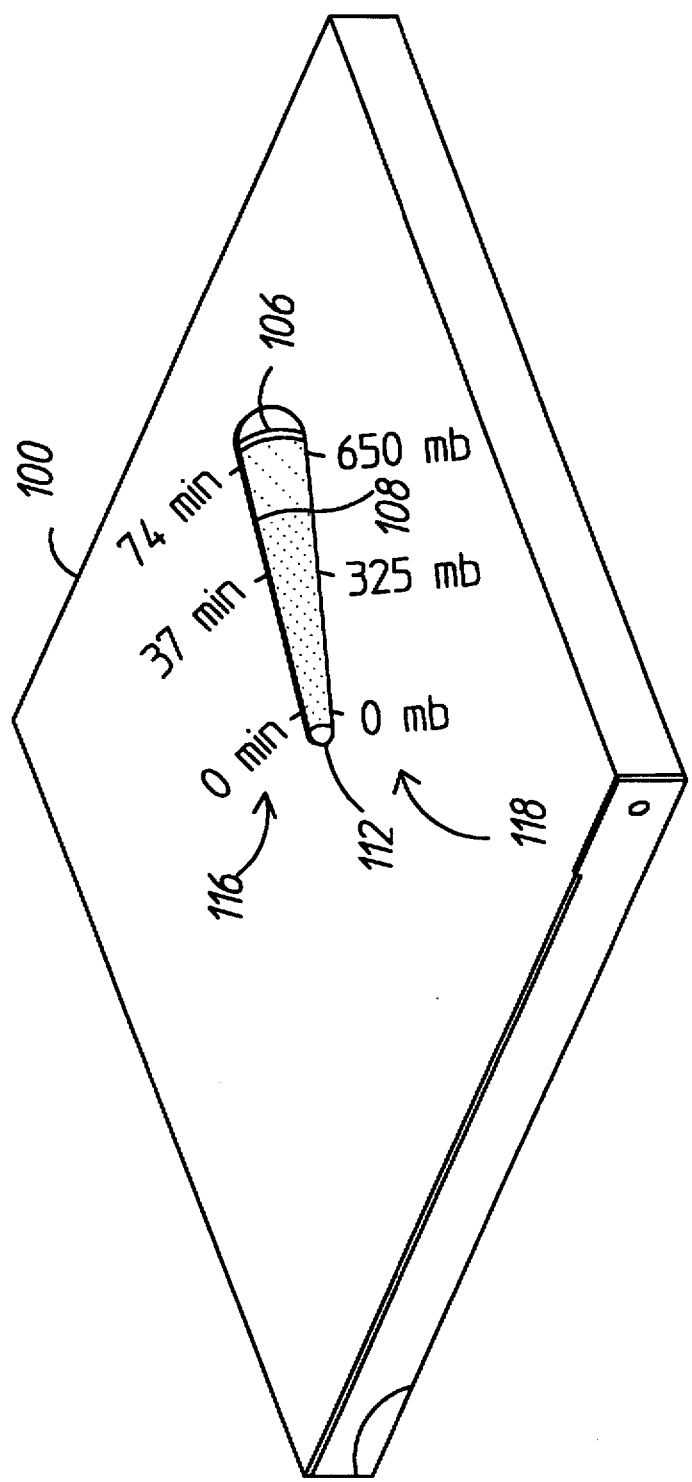
FIG. 2A is a perspective bottom view of the compact disc container of FIG. 1.
Figure 2B:
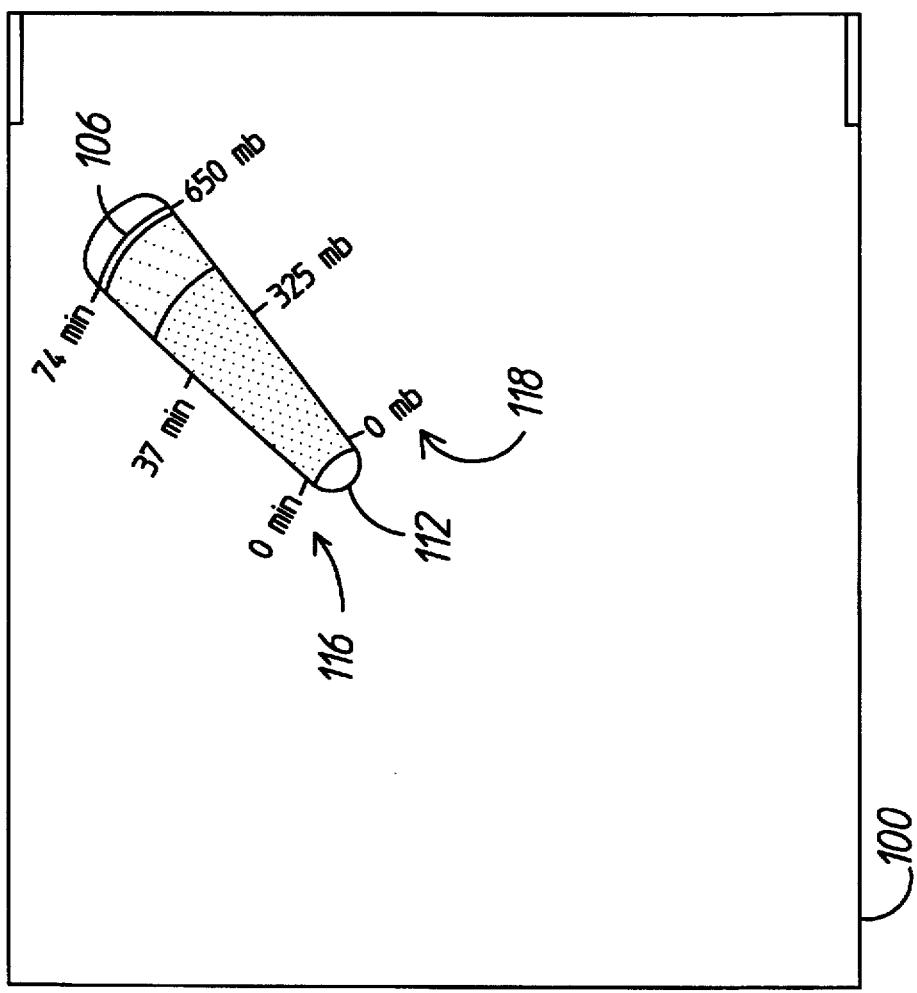
FIG. 2B is a plain bottom view of the compact disc container of FIG. 1.

FIGS. 2A and 2B illustrate the bottom of the assembled jewel box. Disc 106 and, in particular, boundary 108 are visible through aligned windows 112 and 114 and transparent bottom 100. The two printed scales 116 and 118 are also visible. Scale 116 indicates time. The time scale 116 is of primary interest for digital audio. The other scale 118 indicates memory. For simplicity of illustration, only the ends and mid-points of the scales are marked in the figures. Finer resolution may be provided. Boundary 108 and scale 116 illustrated in FIGS. 2A and 2B indicate that approximately 55 minutes of a possible total 74 minutes have been recorded. Alternatively, scale 116 could be reversed to indicate that disc 106 can record an additional 19 minutes of digital audio. Boundary 108 and scale 118 illustrated in FIGS. 2A and 2B indicate that approximately 490 megabytes of a megabytes have been recorded. Alternatively, scale 118 could be reversed to indicate that disc 106 can record an additional 160 megabytes of data. Four scales could be provided, one for recorded time, a second for available time, a third for recorded data, and a fourth for available data.

In the example embodiment illustrated in FIGS. 1, 2A and 2B, the bottom part 100 is transparent, the scales 116 and 118 are printed on a separate printed material, and windows 112 and 114 are openings. The separate printed material 102 is optional. As an alternative, the scales 116 and 118 may be printed or molded onto the bottom part 100. The bottom part 100 may be opaque with an open area for a window. Alternatively, the printed material 102 and the insert 104 may be transparent. Any one or all of the bottom part 100, the printed material 102, and the insert 104 may be made of opaque material with a transparent or translucent area for a window area. The basic requirement is that when the disc 106 is inside the jewel box, the boundary 108 must be sufficiently visible external to the box to permit visual location of the boundary. In addition, the scales 116 and 118 must be visible externally.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A container for a data disc, the data disc having at least one surface that is recordable, the surface that is recordable having a visible boundary between a recorded area and an unrecorded area, the container comprising:

an outer box that is transparent;

at least one layer of additional material mounted in the outer box, the additional material capable of remaining in the outer box when the data disc is removed from the container;

a window area in the additional material, the window area positioned so that when the data disc is inside the container, the boundary on the surface that is recordable is visible through the window area; and a scale, formed on the layer of additional material, adjacent to the window area, the scale indicating a numerical value associated with a location of the boundary on the data disc, the scale visible through the outer box.

2. The container of claim 1, the scale indicating time.

3. The container of claim 1, the scale indicating amount of data.

* * * * *